INVENTOR.
Rudolph Daub
BY
ATTORNEY

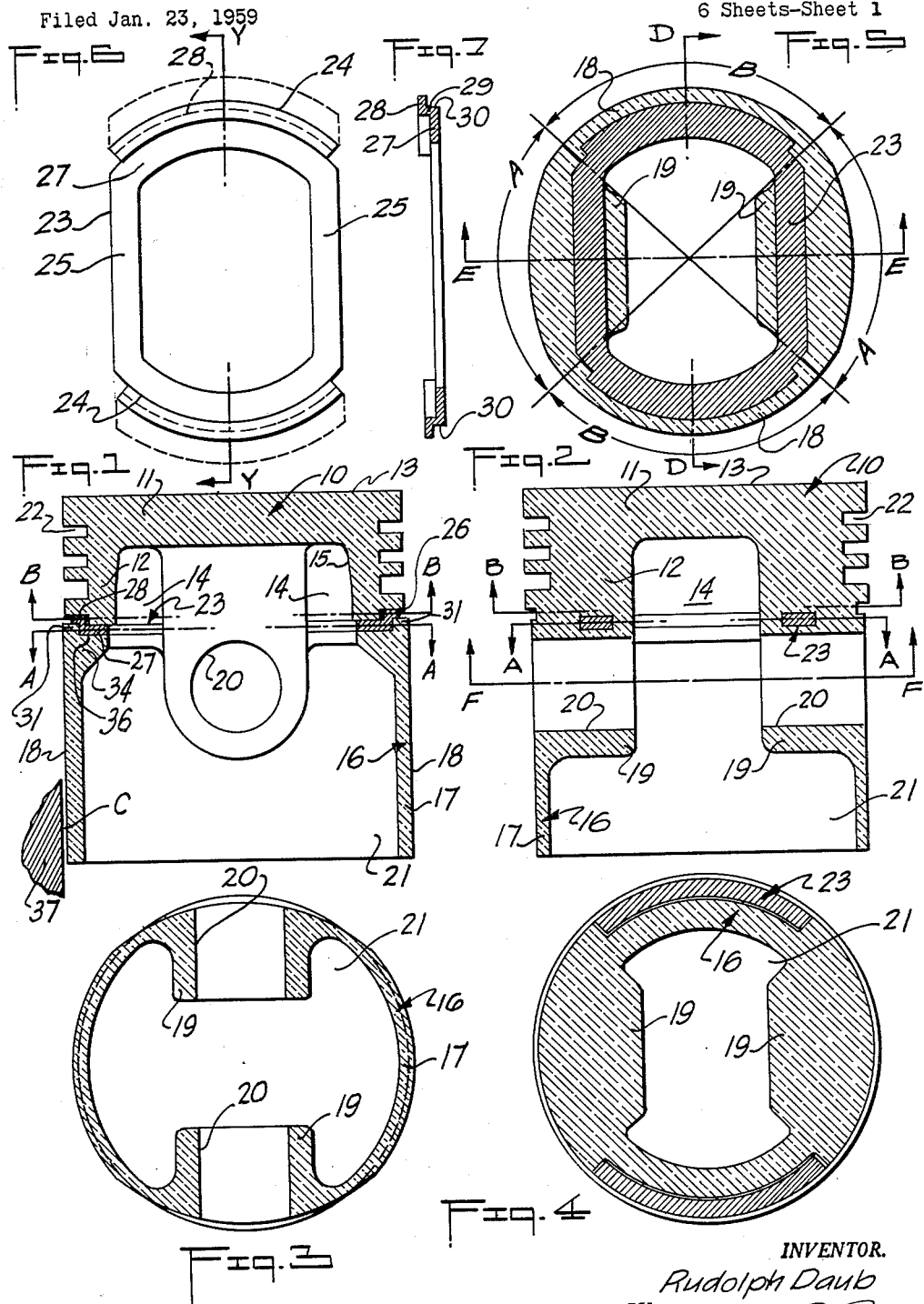

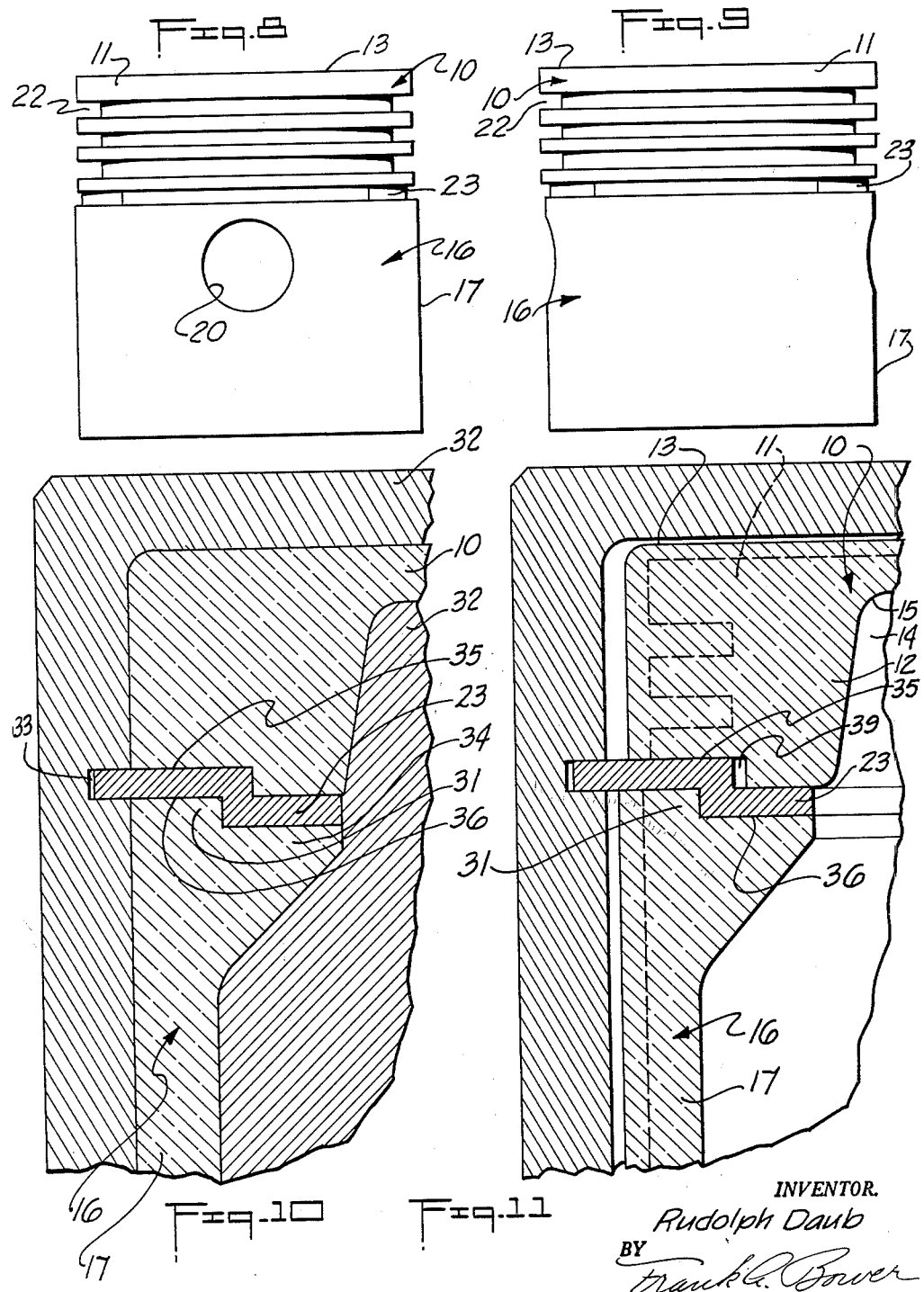

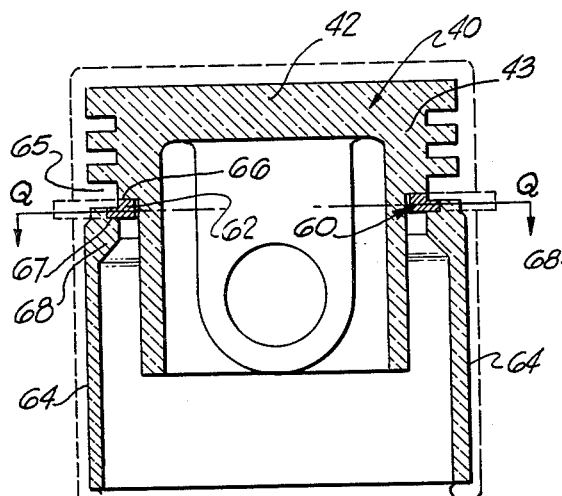
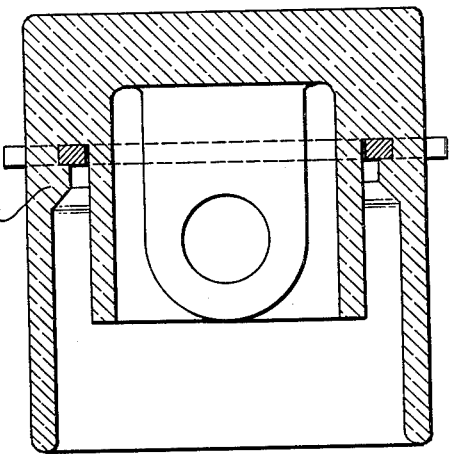
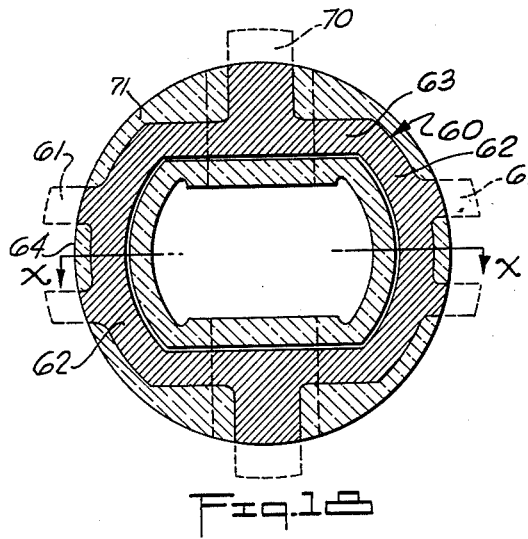
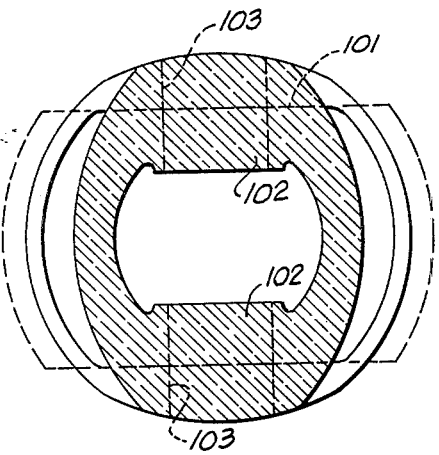

Nov. 7, 1961 R. DAUB 3,007,755
PISTON
Filed Jan. 23, 1959 6 Sheets-Sheet 5
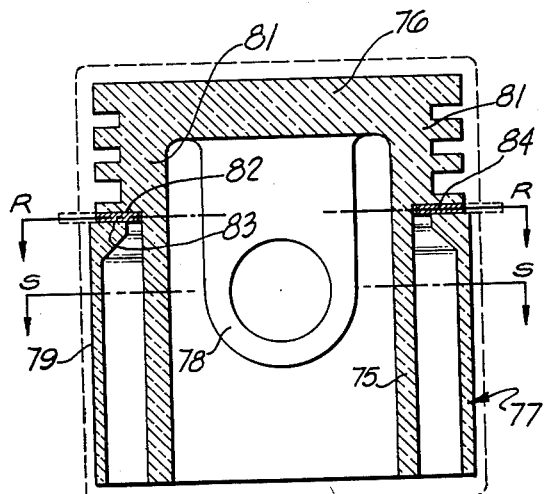
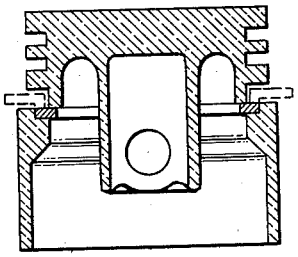
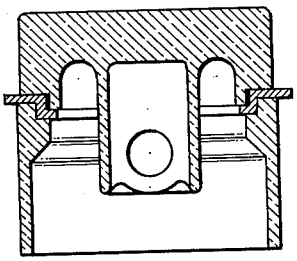
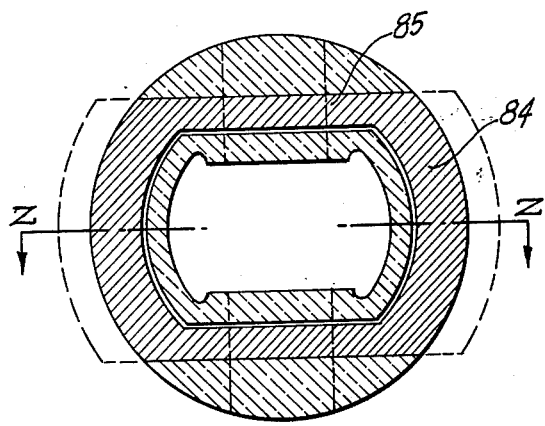
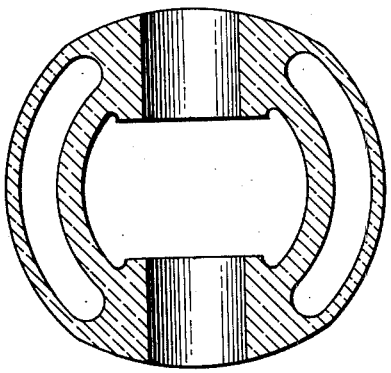
INVENTOR.
Rudolph Daub
BY Frank C. Bower
his ATTORNEY Nov. 7, 1961 R. DAUB 3,007,755
PISTON
Filed Jan. 23, 1959 6 Sheets-Sheet 6
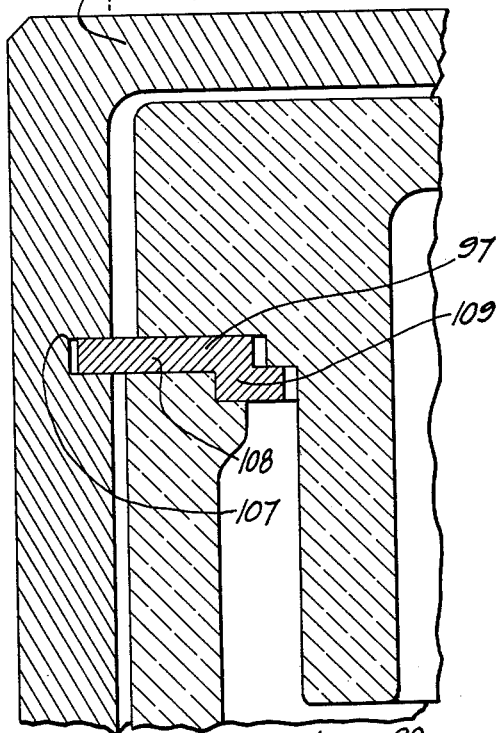
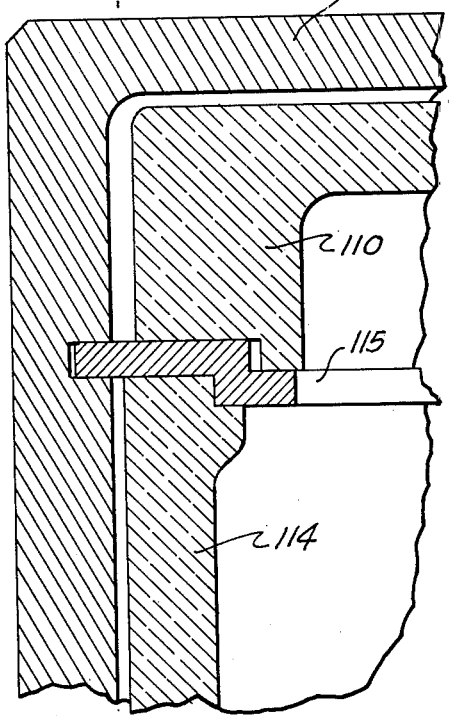
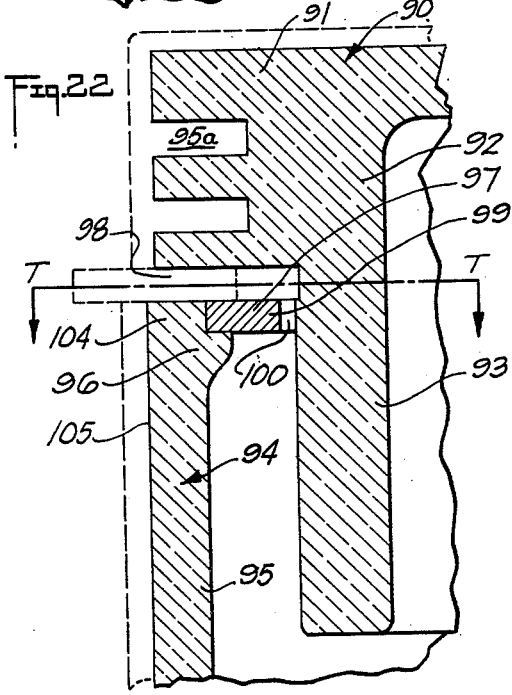
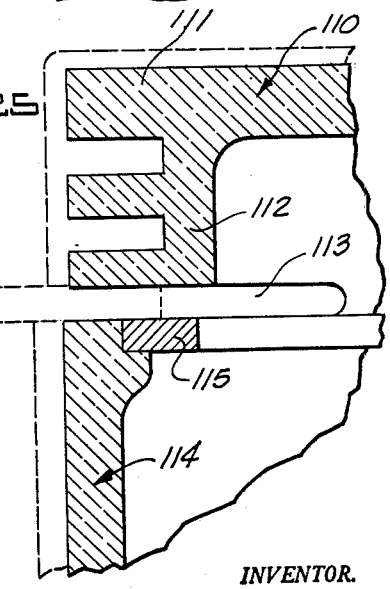
INVENTOR.
Rudolph Daub
BY
Frank G. Bower
his ATTORNEY 3,007,755
PISTON
Rudolph Daub, 9 Hickory Drive N., West Caldwell, N.J.
Filed Jan. 23, 1959, Ser. No. 788,573
10 Claims. (Cl. 309—14)

This invention relates to pistons for internal combustion engines, and particularly to pistons made of aluminum or aluminum alloy.

A piston consists of three different parts which are the dome, the wrist pin bosses and the cross head. As a rule, all three are cast as a single piece. For heavy duty service, such as in diesel engines having about 18:1 compression ratios and maximum pressures of 1300 p.s.i. or more, the parts are cast in one solid rigid structure. When used in cast iron cylinders this type of aluminum piston preferably forms a clearance between the piston and the cylinder of about .002" per inch of diameter with the engine at room temperature, or .008" total clearance for a piston of four inches diameter. This total clearance decreases to about .002" or less with the engine at the desired operating temperatures because of the difference in the coefficients of expansion between the aluminum piston material and the iron cylinder. This initial clearance causes piston slap and sometimes high oil consumption. The piston slap causes the engine to be noisy and the high oil consumption causes the engine to smoke on warming up.

In heavy duty commercial applications where diesels are generally used, these conditions are accepted. However, in the passenger car field, both noise and smoke are strenuously objected to. The maintenance of a constant close clearance of not more than .001 to .002 at all times and under all temperature conditions has been successfully accomplished in pistons used in passenger car engines during the last two decades. This is done in general by disconnecting part of the ring carrying dome from the crosshead and controlling the diameter of the crosshead to conform with minimum clearance to the diameter of the cylinder under all operating conditions, thereby eliminating slap, noise and oil pumping.

The separation of the piston dome from the crosshead, however, results in two disadvantages. The piston dome is considerably weakened, and the heat flow from the dome and ring land zone is greatly impaired. These disadvantages have limited the maximum pressurers in passenger car engines to 600 p.s.i., for satisfactory life and service. However, for higher compression ratios, maximum pressures and specific outputs per square inch of piston area, solid type pistons have been used in the passenger car field of Europe. Piston slap and noise has been reduced, though by no means eliminated, by using super-eutectic aluminum alloys with a lower expansion coefficient than ordinary aluminum and also by making the piston longer, similar to the practices applied in the diesel field in the past. Since a longer piston renders a heavier and costlier engine, no solid pistons are used in the majority of passenger cars. The noise, still in evidence in these solid pistons, is also unacceptable in most cases.

An object of the invention is to provide a piston of aluminum or aluminum alloy of short axial length with a close fitting of the skirt in the cylinder bore that has a high heat transfer capacity and a high capacity to withstand stress produced by ignition of highly compressed gases.

Another object of the invention is to provide inexpensive aluminum or aluminum alloy pistons that withstand compression in ratios of 10:1 and greater and operate with a minimum amount of piston slap and oil consumption.

A further object of the invention is to provide a high stress aluminum and aluminum alloy piston that maintains a close clearance with the cylinder bore over the range of operating conditions.

Other objects and advantages will be apparent from the following description taken in connection with the drawings in which:

FIG. 1 is a sectional view of the piston embodying the invention taken along a section indicated by lines D—D of FIG. 5;

FIG. 2 is a sectional view of the piston embodying the invention taken along a section through the wrist pin bosses indicated by lines E—E of FIG. 5;

FIG. 3 illustrates a section of the piston embodying the invention taken through the wrist pin journals indicated by lines F—F of FIG. 2;

FIG. 4 illustrates a section of the piston embodying the invention taken along the section indicated by lines B—B of FIG. 1;

FIG. 5 illustrates a section of the piston embodying the invention taken along lines A—A of FIG. 2;

FIG. 6 shows a plan view of the partition prior to being embedded in the piston;

FIG. 7 is a sectional end view of the partition taken along lines Y—Y of FIG 6;

FIG. 8 is a side view of a piston embodying the invention illustrating the wrist pin journal side of the piston;

FIG. 9 is a side view of the piston embodying the invention illustrating the thrust bearing crosshead side of the piston;

FIG. 10 is a sectional view of the step in the process of molding the piston prior to the cooling of the solidified piston;

FIG. 11 is a sectional view of the step in process of molding the piston after cooling and contraction of the piston with the finished machined surfaces indicated in dot and dash lines;

FIG. 16 is a sectional view of another piston embodying the invention taken along an axial plane as indicated by lines X—X of FIG. 18;

FIG. 17 is a sectional view of another embodiment of the piston before the machining of the piston taken along the same section as FIG. 16;

FIG. 18 is a sectional view of the piston taken along lines Q—Q of FIG. 16;

FIG. 19 illustrates a sectional view of an embodiment with an inner cylindrical portion extending from the dome taken along lines Z—Z of FIG. 20;

FIG. 20 illustrates a sectional view of the embodiment of FIG. 19 taken along lines R—R of FIG. 19;

FIG. 21 is a sectional view of the embodiment taken along lines S—S of FIG. 19;

FIG. 22 is a sectional view of an embodiment in which the insert in the finished piston does not contact the dome over the thrust surface sector and the dome extends to overlap with the crosshead taken along lines 22—22 of FIG. 23;

FIG. 23 is a sectional view illustrating the insert taken along lines T—T of FIG. 22;

FIG. 24 is a sectional view of piston and insert after cooling and solidification;

FIG. 25 is a sectional view of an embodiment without the dome extending to overlap with the crosshead;

FIG. 26 is a sectional view to show the relation of the piston and mold with the dome and insert in contact after casting.

FIGS. 27 and 28 are sectional views of modification of the embodiments of FIG. 16 and FIG. 1 respectively wherein the dome extension is of a smaller diameter and is separated and spaced from the extension carrying the rings.

Figure 12:
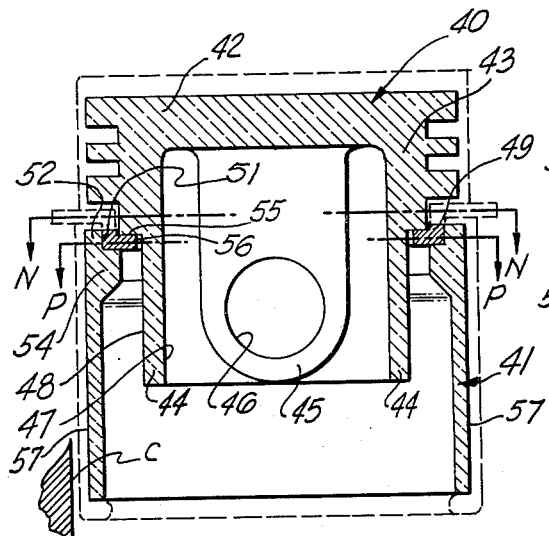
FIG. 12 illustrates another embodiment of the invention in which the cylindrical sections extend longitudinally from the dome of the piston.
Figure 13:
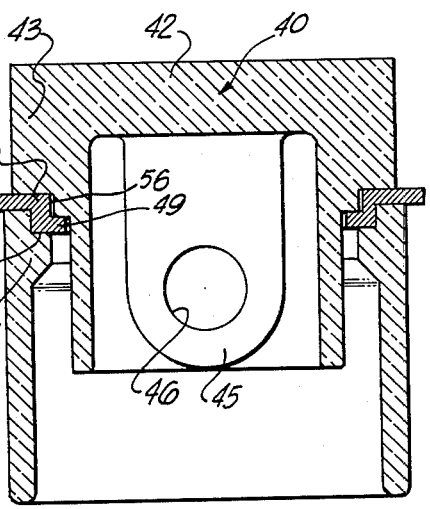
FIG. 13 illustrates the molded piston of FIG. 12 prior to finishing.
Figure 14:
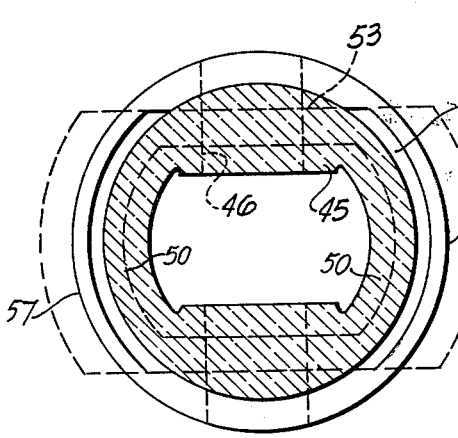
FIG. 14 is a sectional view taken along lines N—N of FIG. 12.
Figure 15:
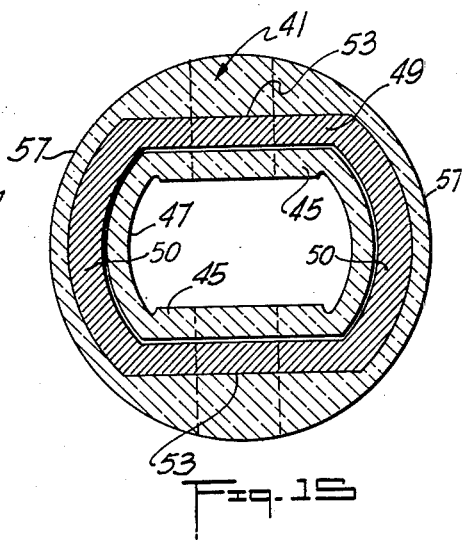
FIG. 15 is a sectional view taken along lines P—P of FIG. 12.

Referring to the embodiment of the piston illustrated in FIGS. 1–9 the dome 10 comprises a top circular plate 11 and a longitudinal extension 12. The top plate 11 has a top surface 13 forming a wall of the combustion chamber and receiving the heat of the high compression explosion. The extension 12 is dependent from the outer peripheral area of the top plate and forms an inner chamber 14 with a surface 15. A cylindrical shaped crosshead portion 16 is dependent below the dome and has a cylindrical shaped skirt portion 17 connected to the dome over diametrically opposed wrist pin boss section A—A (FIG. 5). The crosshead has sectors B disconnected from the dome to permit relative movement between the thrust bearing portions 18 of the crosshead. The bosses 19 are diametrically opposed and extend from the top plate of the piston downward along the extension 12 to the crosshead. The wrist pin bearings 20 are located in the portion of the bosses formed as part of the crosshead. The crosshead forms a chamber 21 which forms with the dome chamber a single space within the piston. Piston ring grooves 22 are formed in the side of the dome in any conventional manner.

Embedded within the piston and extending between the extension 12 of the dome and the crosshead 16 is a metal insert 23 having a coefficient of expansion less than the aluminum or aluminum alloy of the dome and crosshead. The insert has a generally Z shape. The insert is illustrated in FIGS. 6 and 7 and comprises two curved portions 24 and two straight portions 25. The straight portions are embedded in the piston and the curved portions are located in a slot 26 formed by the curved portions between the extension and the crosshead.

In the embodiment of FIGS. 1–8 the curved portions are stepped to form two radial portions 27, 28 extending in parallel planes and a longitudinal or axially extending intermediate portion 29. The intermediate portions form outward facing surfaces or edges 30, which engage ledge portions 31 on the crossheads. The contraction of the crosshead presses the ledges against the surfaces to place the insert under a compressive stress and limit the shrinkage of the thrust surfaces 18 of the crosshead.

The molding of the piston is illustrated in FIGS. 10 and 11. A conventional molding apparatus 32 may be used with the insert mounted in a circumferential groove 33. The molten aluminum or aluminum alloy is poured flowing around the insert and against the walls of the mold. The molten metal solidifies and cools. As the aluminum metal contracts it draws away from the mold 32. The steel insert 23 has a small coefficient of expansion and contraction and therefore there is not a great reduction in the radial plane. The ledge 31 firmly engages the surface of the insert. The insert has a cross sectional area and strength to resist the inward contraction of the thrust portions of the crosshead. The contractive forces place the insert under a high compressive stress. The insert, however, holds the thrust portion 18 of the crosshead to a narrow clearance. As the dome cools it moves radially inward. Since there are no axially coupling surfaces the dome shifts in relation to the insert and forms a small gap 39 extending circumferentially with the curved portion between the extension 12 of the dome and the intermediate portion.

The dome engages the upper surfaces of the insert and the crosshead engages the lower surfaces. The crosshead has an expanded portion 34 at the upper end to provide a large radial width so that the insert is supported through its entire length and width. This engagement seals the space formed by the curved portions and prevents the passage of oil from the space within the piston to the walls of the cylinder.

The straight portions 25 are entirely embedded in the bosses 14 and couple the two curved portions to carry the compressive stresses applied to the curved portions. The firm embedding of the straight portions provides a firm support to prevent buckling or distortion of the inserts. The general contraction or reduction of the dimensions of the aluminum piston causes the piston dome extension and the crosshead to squeeze the curved portions between their facing surfaces 35, 36. This provides a good seal of the slot formed by the insert. The curved portions also provide a support between the dome and the crosshead portion to form a solid integral structure that can withstand the repeated forces applied to the piston by the combustion of the highly compressed mixture in the combustion chamber. The contacting of the extension 12 with the crosshead portion 16 provides a heat path for the heat carried by the extension from the closure dome 10. The heat is thus transmitted to the crosshead portion for dissipation.

The insert maintains the thrust surfaces of the crosshead in a close clearance C with the walls of the cylinder 37 to prevent slapping of the pistons. The insert is gripped and embedded in the boss sector of the piston and free in the thrust surface sector to change its physical size in accordance with the characteristics of steel. Thus the diameter of the thrust surfaces will have the expansion and contraction characteristics of steel. The steel insert prevents the inward contraction of the crosshead along the thrust surfaces. The contraction forces develop a high stress which clamps the crosshead against the insert and maintains a pressure on the insert. As the crosshead heats the stress is relieved. However, the contraction forces provided a pressure against the insert over the operating temperature range. The thrust sectors being limited by the steel insert to the expansion and contraction of the steel, the clearance of the thrust surfaces may be small and not vary widely with operation of the engine.

The heat in the top plate is transmitted through the top plate to the under surface 15 where it is removed by the oil and is conveyed down the sides of the dome by the extension 12 and the bosses 14 where the heat is removed by the oil forced up inside of the piston.

The embodiments illustrated in FIGS. 12 to 15 provide a different relationship of the dome 40 and crosshead 41. The dome 40 has a top plate 42 and an extension 43 as in the previous embodiment. A cylindrical member 44 extends downward from the extension and within the crosshead. The cylindrical member is concentric with the axis of the piston. The wrist pin bosses extend from the crosshead and through the cylindrical member to provide bearing surfaces 46 extending from the outer surface of the piston to within the cylindrical member (FIG. 12). The connecting rod fits in between the ends of the bosses. The cylindrical member is preferably connected to the dome through its entire circumferential length to provide a rigid connection between the member and the dome for transferring the forces applied to the piston and providing a heat path for conducting the heat from the dome. The cylindrical member has an inner cylindrical surface 47 and an outer cylindrical surface 48 for transferring heat from the member to the oil splashing within the piston.

The crosshead is connected to the dome extension along sectors including the bosses and is separated along opposite sectors by the insert 49. This separation prevents relative shifting of the dome and the crosshead along these sectors. The insert 49 is cast in the piston in a manner similar to the previous embodiment. The curved portions 50 of the insert are cut away during machining with the surface 51 pressing against the ledge or lip 52 of the crosshead to prevent shrinkage or contraction of the crosshead in the sector transverse to the wrist pins. The insert has straight sides 53 which are embedded in the wrist pin bosses 45. The crosshead has an increased thickness portion 54 at the upper end to provide a surface 55 for the insert to engage. In this embodiment the insert portions extend beyond the inner surface into the interior space. The dome being free to contract, draws away from the inner surface 56 of the curved portion to form a gap therewith. The insert maintains a close clearance of the thrust surfaces 57 with the steel walls of the cylinder.

In FIGS. 16–18 a modification of the embodiment in FIGS. 12–15 is shown. The insert 60 has tongues 61 extending generally radially from the edges of the curved portions 62 to fit in the walls of the mold. The molten aluminum metal flows around the insert and tongues and solidifies and contracts to bear against the end surfaces of the insert. The bosses, in which the straight portions 63 are embedded, press against the side portions and bow the curved portion to press against the edge or lip of the crosshead.

The tongues are machined off leaving a small portion extending to the outer thrust surface 64 of the crosshead 71. A groove 65 is also cut to sever the dome from the crosshead over the sector. The groove 65 is cut to a depth so that the surface 66 of the extension of the dome does not overlap with the surface 67 on the expanded portion 68 of the crosshead. The straight portions 63 also have tongues 70 extending to fit into the molds. The ends of the tongues are machined off in the finishing steps. An inner member 72 extends downward from the extension 43 for conveying heat therefrom.

In FIGS. 19–21 the cylindrical member 75 extends from the dome 76 to the lower end of the crosshead 77. The cylindrical member is concentric to the axis of the piston. As in the previous embodiment the crosshead is connected to the dome in the two opposing sectors adjacent the wrist pin bosses 78 and is separated adjacent to the thrust bearing surfaces 79. The insert 84 is flat and the curved portions 85 are flat. This permits the crosshead member to expand and contract freely without the insert controlling the crosshead diameter. The dome is separated by the insert from the crosshead over the thrust surface sector. The dome shifts freely of the crosshead. During the casting process the dome can shrink fully without overstressing the crosshead. This form of piston can only be used in aluminum cylinders. Therefore the piston has the same coefficient of expansion as the aluminum metal of the cylinder. The crosshead follows the bore to maintain a close clearance "c" with the bore.

The extension 81 has a radial extending surface 82 that overlaps with the radial bearing surface 83 in the expanded portion of the crosshead. The curved portions 84 of the inserts 85 fit between these surfaces and permit the relative movement between the dome and the crosshead. The curved portions provide a support between the dome and the crosshead to strengthen the dome structure.

In the embodiment shown in FIGS. 22–24 the dome 90 has a top plate 91, side extension 92 and a dependent member 93 overlapping with the crosshead 94. Piston ring grooves 95a are cut in the dome. The crosshead 94 has a cylindrical skirt 95 and a bead 96 along the upper edge. The insert 97 fits in notches along the thrust surface sectors. A groove 98 is machined to separate the dome from the crosshead through the thrust surface sectors. The curved portions 99 of the insert are separated from the dome by the groove 98 and the space 100 between the curved portion and the member 93. The straight portions 101 of the insert are embedded in the metal of the piston to firmly support the insert. The crosshead is molded to the dome through the wrist pin boss sectors to firmly attach the crosshead to the dome. The wrist pin bosses 102 extend downwardly as in the other embodiments and have wrist pin bearings 103. The crosshead along the thrust surface sector is independent of the dome. The insert bears against the ledge 104 to retain the clearance with the cylinder wall along the thrust surfaces 105.

In FIG. 24 the relation of the cooled solid piston and the mold 106 is illustrated. The insert is held in the grooves 107. The portion 108 is removed when the slot is cut in the piston so that the insert along the curved portion does engage the dome.

FIGS. 25 and 26 illustrate a modification of the previous embodiment. The dome 110 has a top plate 111 and extension 112. A groove 113 is cut to separate the crosshead 114 and the curved portion 115 of the insert from the dome. The dome has no dependent member and therefore has not the strength of the previous embodiment. In FIG. 26 the relation of the mold 116 and the cooled piston is illustrated. The insert is supported along its outside diameter in the mold cavity. This provides for the separation of the dome and crosshead and also permits an inner member to extend downwardly from the top plate to provide additional strength to the dome and to increase the capacity of the dome to withstand high temperature and heat.

FIG. 27 illustrates a modification of the embodiment shown in FIG. 16. In this embodiment the dome 40 has an inner member 118 dependent from the under surface of the top plate 42. This inner member has a generally cylindrical shape and merges with the bosses 69. As distinguishing from the embodiment of FIG. 27 the inner member is spaced inwardly from the extension 43 and from the inner edges of the insert 60 to form spaces 117.

In FIG. 28 this structure is applied to modify the embodiment of FIG. 1. The piston is illustrated in an unfinished form. The inner member 120 is dependent from the top plate 11 of the dome 10 and spaced radially inward from the extension 12 and the insert 23 to form spaces 119. This inward positioning of the inner member reinforces the center portion of the top plate and provides a metal path for extracting the heat from the dome.

It is thus seen that the aluminum piston described has many advantages. The contraction forces of the dome are not transmitted to the crosshead. Thus no stresses are developed between these two parts. This permits the dome to have walls of the desired weight and strength to conduct heat and withstand stress. It also permits the walls of the crosshead to have the desired thickness and flexibility to attain the desired clearances over the operating range. The curved portions provide a heat path from the dome to the crosshead by the firm contact with both members. Thus a heat path is provided over the thrust sectors of the piston. This contacting of the curved portions and the closing of the space between the dome and crosshead prevents the passage of oil into the piston ring area and into the combustion chamber. This elimination of oil pumping is important for high compression engines which create a high vacuum when the throttle is closed. Also in two cycle engines with ported cylinder walls and crank case compression, an unperforated piston body particularly near the ring zone is very desirable.

Various modifications and changes may be made in the foregoing embodiments without departing from the invention as set forth in the appended claims.

I claim:

1. A cast piston of light metal for an internal combustion engine comprising a laterally extending dome, a generally cylindrically shaped crosshead extending axially and having diametrically opposite thrust sectors and diametrically opposite boss sectors, said crosshead spaced from said dome over said thrust sectors and bosses attaching said crosshead to said dome over said boss sectors, said crosshead and said dome having radially extending facing surfaces spaced to form slots extending over said thrust sectors, axially extending walls intermediate said radially extending surfaces of said crosshead of each sector, an insert having a low coefficient of expansion and contraction and having portions embedded in said bosses and having curved portions engaging the axially extending walls, said curved portions engaging said radial surfaces of said dome and crosshead on both sides of said axially extending walls to form an extended heat path from said dome to said skirt.

2. A cast piston of light metal for an internal combustion engine comprising a laterally extending dome, a generally cylindrically shaped crosshead extending axially and having diametrically opposite thrust sectors and diametrically opposite boss sectors, said crosshead spaced from said dome over said thrust sectors and bosses attaching said crosshead to said dome over said boss sectors, said crosshead having end surfaces extending circumferentially over the arc of said thrust sectors and facing corresponding radial surfaces on said dome and spaced to form diametrically opposite slots, said end surfaces of said crosshead formed in two portions with intermediate axially extending inwardly facing walls forming ledges to receive the pressure of dimension retaining insert, said radial surfaces on said dome formed in two portions with intermediate axially extending outwardly facing walls inwardly spaced from said crosshead intermediate walls to form continuous slots through said piston, an insert having a low coefficient of expansion and contraction having straight segments embedded in said bosses and curved segments fitting in said slots, said curved segments being stepped forming radially extending members fitting between the radial surfaces of the dome and crosshead and an axially extending member engaging said intermediate walls of said crosshead for holding said crosshead against variations in the thrust diameter and said radial members engaging the radial surfaces of said dome and crosshead on each side of said walls to provide heat conducting paths on both sides of said axial member.

3. A cast piston of light metal for an internal combustion engine comprising a laterally extending dome, a tubular cylindrically shaped crosshead extending axially and having diametrically opposite boss sectors and diametrically opposite thrust sectors, bosses attaching said crosshead to said dome in said boss sectors, said dome and said crosshead having facing radial surfaces spaced from one another to permit relative radial movement, an insert having a low coefficient of expansion and contraction fitting between said surfaces and in contact therewith to provide a heat path from said dome to said crosshead and a tubular member formed as a single piece with said dome and joining said dome adjacent said space between said dome and crosshead to provide a heat conducting path from said dome.

4. A cast piston of light metal for an internal combustion engine comprising a dome, a tubular cylindrically shaped crosshead extending axially from said dome and having diametrically opposite thrust sectors and diametrically opposite boss sectors said crosshead detached from said dome over said thrust sectors and bosses attaching said crosshead to said dome over said boss sectors, a tubular shaped means formed as a single piece with said dome and extending axially inside of said crosshead to provide a heat path for conducting heat from said dome.

5. A cast piston of light metal for an internal combustion engine comprising a laterally extending dome, a tubular cylindrical crosshead dependent axially from said dome, two bosses diametrically opposite to one another attaching said crosshead to said dome over boss sectors, said crosshead separated from said dome by two slots on diametrically opposite sides of said piston to permit expansion and contraction of said crosshead over thrust sectors independent of said dome to maintain a close clearance of said crosshead with a cylinder wall, generally tubular shaped means axially dependent from said dome as a single piece therewith between said bosses in diametrically opposite sides thereof to conduct heat from said dome.

6. A cast piston as set forth in claim 5 wherein insert means extending over the thrust sectors are provided to fill said slots and contacting said dome and crosshead to transfer heat from said dome to said crosshead.

7. A cast piston as set forth in claim 5 wherein said means extend axially to form a cylindrical member providing a large surface area for removing heat from said members and said dome.

8. A cast piston as set forth in claim 6 wherein said insert means has a low coefficient of expansion and contraction and has embedded portions and portions extending radially in said slots and axial portions dependent from said radial portions, said axial portions engaging said crosshead to press said crosshead outwardly over the thrust surfaces.

9. A cast piston as set forth in claim 6 wherein said crosshead has axial surfaces extending over the arc of said thrust sectors and said insert means has a low coefficient of expansion and contraction and has embedded portions and radially extending portions engaging said axial surfaces for holding said crosshead against variations over the thrust sectors.

10. A cast piston as set forth in claim 6 wherein said crosshead has inwardly facing axial surfaces extending over thrust sectors and forming said slots into a generally Z shape and said insert means has a low coefficient of expansion and contraction and has embedded portions and thrust sector portions having generally Z shapes and outwardly facing axial surfaces engaging said inwardly facing surfaces of said crosshead to hold said crosshead against variations over the thrust sectors.

References Cited in the file of this patent

UNITED STATES PATENTS

| | | |
|---|---|---|
| 1,969,470 | McCoy | Aug. 7, 1934 |
| 2,715,052 | Jardine | Aug. 9, 1955 |

FOREIGN PATENTS

| | | |
|---|---|---|
| 924,297 | Germany | Aug. 22, 1955 |